(12) United States Patent
Yamada et al.

(10) Patent No.: US 7,536,994 B2
(45) Date of Patent: May 26, 2009

(54) INTERNAL COMBUSTION ENGINE AND FUEL INJECTION METHOD IN INTERNAL COMBUSTION ENGINE

(75) Inventors: Takuya Yamada, Saitama (JP); Teruyoshi Morita, Saitama (JP); Yoshikazu Ishitsuka, Saitama (JP); Naoaki Takeda, Saitama (JP); Atsushi Umemoto, Saitama (JP); Ken Ogawa, Saitama (JP); Noritaka Kimura, Saitama (JP); Takeo Kobayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/000,555

(22) Filed: Dec. 13, 2007

(65) Prior Publication Data

US 2008/0210198 A1    Sep. 4, 2008

(30) Foreign Application Priority Data

Dec. 22, 2006    (JP)    ............................. 2006-345294

(51) Int. Cl.
*F02B 7/00* (2006.01)
*F02B 7/08* (2006.01)

(52) U.S. Cl. ...................................... 123/431; 123/305
(58) Field of Classification Search ................. 123/431, 123/430, 429, 27 R, 302, 295, 300, 305
See application file for complete search history.

(56) References Cited

U.S. PATENT DOCUMENTS

| 6,499,463 | B1 * | 12/2002 | Berriman et al. | 123/431 |
| 6,604,504 | B2 * | 8/2003 | Surnilla et al. | 123/295 |
| 2002/0184877 | A1 * | 12/2002 | Ishii et al. | 60/277 |

FOREIGN PATENT DOCUMENTS

JP    2003-49651    2/2003

* cited by examiner

*Primary Examiner*—Mahmoud Gimie
(74) *Attorney, Agent, or Firm*—Arent Fox LLP

(57) ABSTRACT

An air-fuel ratio of an air-fuel mixture produced by fuel injected from a first injector into an intake port (or into a combustion chamber) is set in a range of 28 to 38. Therefore, when the temperature and pressure rise with a first combustion started by spark-ignition around a spark plug to the fuel injected from a second injector into the combustion chamber, the timing of starting a second compressive hypergolic ignition is optimized to provide a stable combustion state free of knocking and misfire.

10 Claims, 6 Drawing Sheets

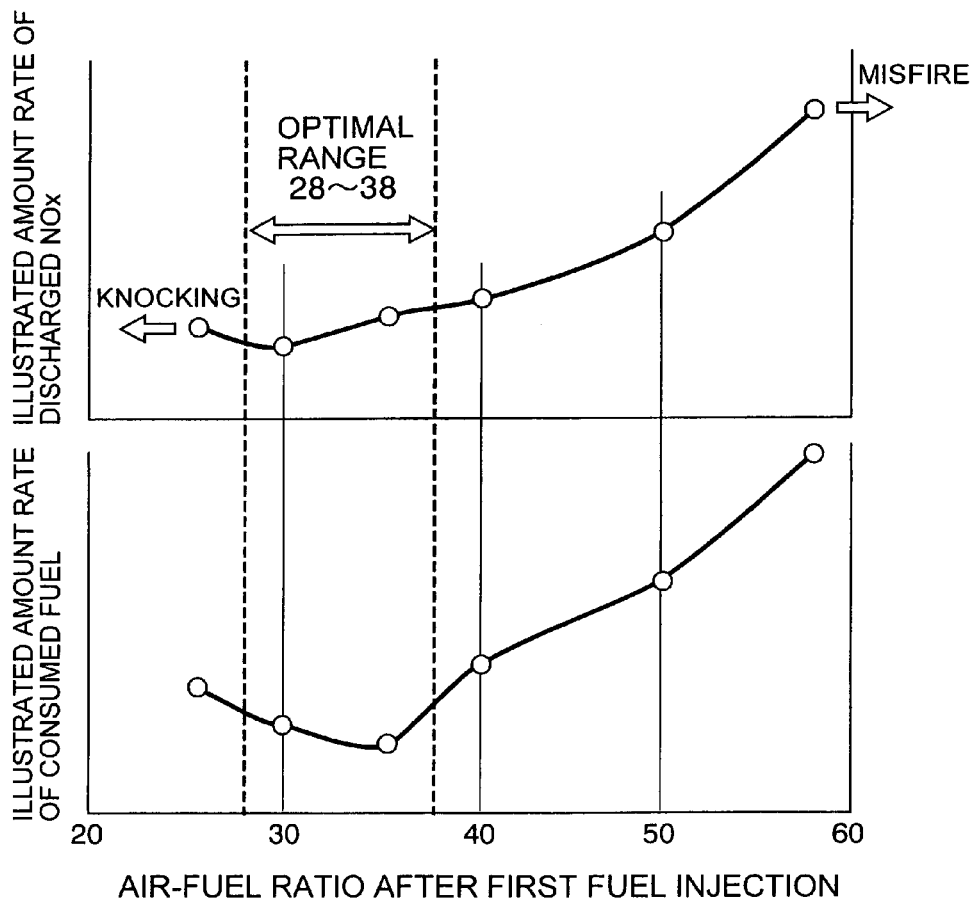

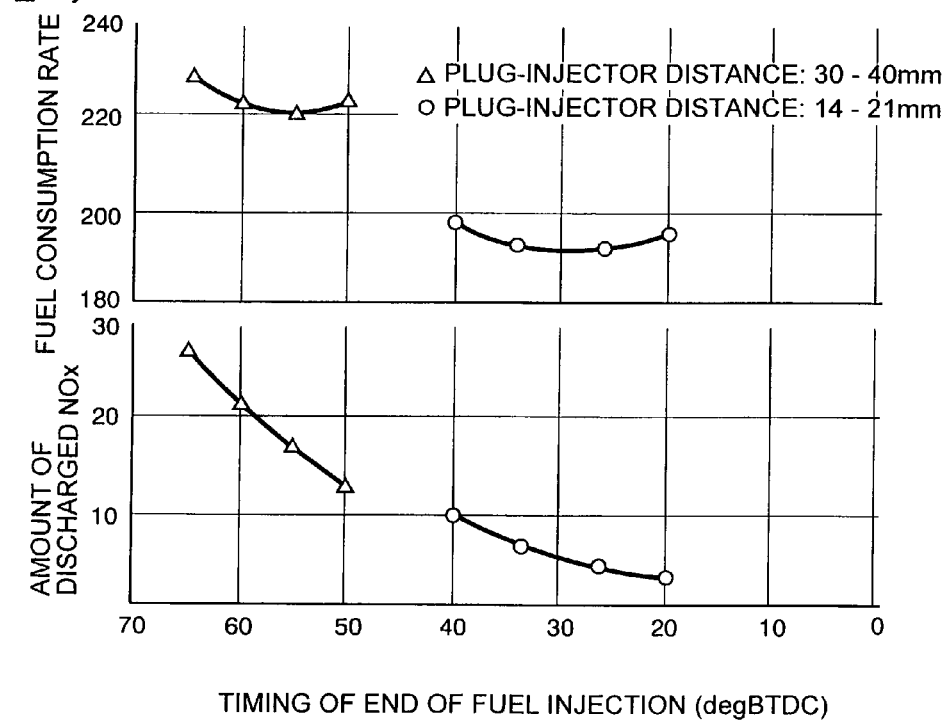

INTERNAL COMBUSTION ENGINE AND FUEL INJECTION METHOD IN INTERNAL COMBUSTION ENGINE

CROSS-REFERENCE TO RELATED APPLICATION

The present invention claims priority under 35 USC 119 based on Japanese patent application No. 2006-345294, filed on Dec. 22, 2006. The entirety of the subject matter of this priority document is incorporated by reference herein.

BACKGROUND OF THE INVENTION

1. Field of the Invention

The present invention relates to an internal combustion engine including: a first injector for injecting fuel into an intake port or a combustion chamber; a second injector for injecting the fuel into the combustion chamber following the injection of the fuel by the first injector; and a spark plug for igniting an air-fuel mixture within the combustion chamber, and also relates to a method of such fuel injection.

2. Description of the Related Art

Japanese Patent Application Laid-open No. 2003-49651 (JP '651) discloses a direct fuel-injection type engine that includes a spark plug and a fuel injection valve for directly injecting fuel into a combustion chamber The engine disclosed by JP '651 conducts a first fuel injection to produce a relatively lean air-fuel mixture within the combustion chamber and a second fuel injection to produce a relatively rich air-fuel mixture around the spark plug. In the engine disclosed by JP '651, a first combustion is conducted by spark-igniting the air-fuel mixture produced by the second fuel injection, and a second combustion is conducted by compressive hypergolic ignition of the air-fuel mixture surrounding the spark plug due to a rise in temperature and pressure within the combustion chamber caused by the first combustion.

However, in the engine disclosed by JP '651, the air-fuel ratio of the air-fuel mixture produced by the first fuel injection is not always appropriate. Therefore, when the operating load is increased, an undesired knocking result occurs due to the enriched air-fuel ratio. Also, when the operating load is decreased, an undesired misfire result occurs due to the lean air-fuel ratio without the compressive hypergolic ignition occurring. Thus, the operating range of the engine disclosed by JP '651 is limited, resulting in the possibility of an insufficient decrease in the amount of discharged NOx and an insufficient decrease in the amount of consumed fuel occurring.

SUMMARY OF THE INVENTION

The present invention has been attained in view of the above situation. It is an aspect of the present invention to provide an internal combustion engine configured wherein a second fuel injection is carried out following a first fuel injection, and wherein a stable combustion is enabled in a wider operating range by optimizing an air-fuel ratio of an air-fuel mixture produced by the first fuel injection.

According to a first aspect of the present invention, there is provided an internal combustion engine including a first injector for injecting fuel into an intake port or a combustion chamber; a second injector for injecting the fuel into the combustion chamber following injection of the fuel by the first injector; and a spark plug for igniting an air-fuel mixture within the combustion chamber. An air-fuel ratio of the air-fuel mixture produced in the combustion chamber due to injection of the fuel by the first injector is set in a range of 28 to 38.

With the above-described structural arrangement, the air-fuel ratio of the air-fuel mixture produced by the fuel injected from the first injector into the intake port or the combustion chamber is set in the range of 28 to 38. Therefore, when the temperature and pressure rise with the first combustion, which is started by spark-igniting the fuel injected from the second injector into the combustion chamber, the timing of starting the second compressive hypergolic ignition is optimized to provide a stable combustion state free of knocking and misfire. Thus, the present invention makes it possible to decrease an amount of discharged NOx and an amount of consumed fuel over a wide range of operating load.

According to a second aspect of the present invention, in addition to the first aspect, an amount of fuel injected by the second injector is fixed at a given value, and an amount of fuel injected by the first injector is changed corresponding to the demanded operating load.

With the above-described structural arrangement, the amount of fuel injected from the second injector is fixed at the given value, and the amount of fuel injected from the first injector changes according to the demanded operating load. Therefore, even if the amount of gas newly drawn into the combustion chamber is changed due to a change in the demanded operating load, the air-fuel ratio of the air-fuel mixture is maintained in the range of 28 to 38.

According to a third aspect of the present invention, in addition to the second aspect, when the demanded operating load is changed, the ratio of an amount of gas residing in a cylinder and an amount of newly drawn gas therein is controlled by adjusting the timing of an exhaust value opening and closing.

With the above-described structural arrangement, the ratio between the amount of gas residing in the cylinder and the amount of newly drawn gas therein is controlled by the opening and closing timing of the exhaust valve corresponding to the change in demanded operating load. Therefore, even if the amount of fuel injected from the first injector is changed due to the change in the demanded operating load, the air-fuel ratio of the air-fuel mixture is maintained in the range of 28 to 38 by changing the proportion of the newly drawn gas.

According to a fourth aspect of the present invention, in addition to any of the first to third aspects, a distance between the second injector and the spark plug is set at a value corresponding to $\frac{1}{6}$ to $\frac{1}{4}$ of an inner diameter of the cylinder.

With the above-described structural arrangement, the distance between the second injector and the spark plug is set at the value corresponding to $\frac{1}{6}$ to $\frac{1}{4}$ of the inner diameter of the cylinder. Therefore, even if the timing of stopping the injection of fuel from the second injector is set to be later than that in the related art engine (JP '651) in order to decrease the amount of discharged NOx and the amount of consumed fuel, a sufficient penetration force of a fuel jet is secured, wherein the air-fuel ratio around the spark plug is sufficiently enriched to prevent misfire and unstable combustion from occurring.

According to a fifth aspect of the present invention, there is provided a fuel injection method in an internal combustion engine, including a first step of injecting fuel from a first injector into an intake port or a combustion chamber; and a second step of injecting the fuel from a second injector into the combustion chamber following the injection of the fuel by the first injector, wherein an air-fuel ratio of an air-fuel mixture produced in the combustion chamber in the first step is set in a range of 28 to 38.

With the arrangement of the above-discussed steps, the air-fuel ratio of an air-fuel mixture produced by the injected fuel from the first injector into the intake port or the combustion chamber is set in the range of 28 to 38. Therefore, when the temperature and pressure rise with the first combustion, which is started by spark-igniting the air-fuel mixture around the spark plug to the fuel injected from the second injector into the combustion chamber, the timing of starting the second compressive hypergolic ignition is optimized to provide a stable combustion state free of knocking and misfire. Thus, it is possible to decrease an amount of discharged NOx and an amount of consumed fuel over a wide range of operating load.

According to a sixth aspect of the present invention, in addition to the fifth aspect, an amount of injected fuel by the second injector is fixed at a given value, and an amount of fuel injected by the first injector is changed corresponding to a demanded operating load.

With the arrangement of the above-discussed steps, the amount of fuel injected from the second injector is fixed at the given value, and the amount of fuel injected from the first injector is changed corresponding to the demanded operating load. Therefore, even if the amount of gas newly drawn into the combustion chamber is changed with the change in the demanded operating load, the air-fuel ratio of the air-fuel mixture is maintained in the range of 28 to 38.

According to a seventh aspect of the present invention, in addition to the fifth aspect, when the demanded operating load is changed, a ratio between an amount of gas residing in a cylinder and an amount of gas newly drawn therein is controlled by the opening and closing timing of the exhaust valve.

With the arrangement of the above-described steps, the ratio between the amount of gas residing in the cylinder and the amount of gas newly drawn therein is controlled by the opening and closing timing of the exhaust valve corresponding to the change in demanded operating load. Therefore, even if the amount of fuel injected from the first injector is changed with the change in the demanded operating load, the air-fuel ratio of the air-fuel mixture is maintained in the range of 28 to 38 by changing the proportion of the newly drawn gas.

The above-mentioned aspects, characteristics, and advantages of the present invention will become apparent from preferred embodiments, which will be described in detail below by reference to the attached drawings.

BRIEF DESCRIPTION OF THE DRAWINGS

FIGS. 4A and 4B are graphs showing changes in a rate of an amount of discharged NOx and a rate of a consumed fuel, respectively, relative to a change in the air-fuel ratio after a first fuel injection;

FIGS. 5A to 5C are graphs showing changes in a penetration force of a lead jet, in a rate of consumed fuel, and in an amount of discharged NOx, respectively, relative to a change in the timing of an end of a second fuel injection.

DETAILED DESCRIPTION OF THE PREFERRED EMBODIMENTS

Figure 1:
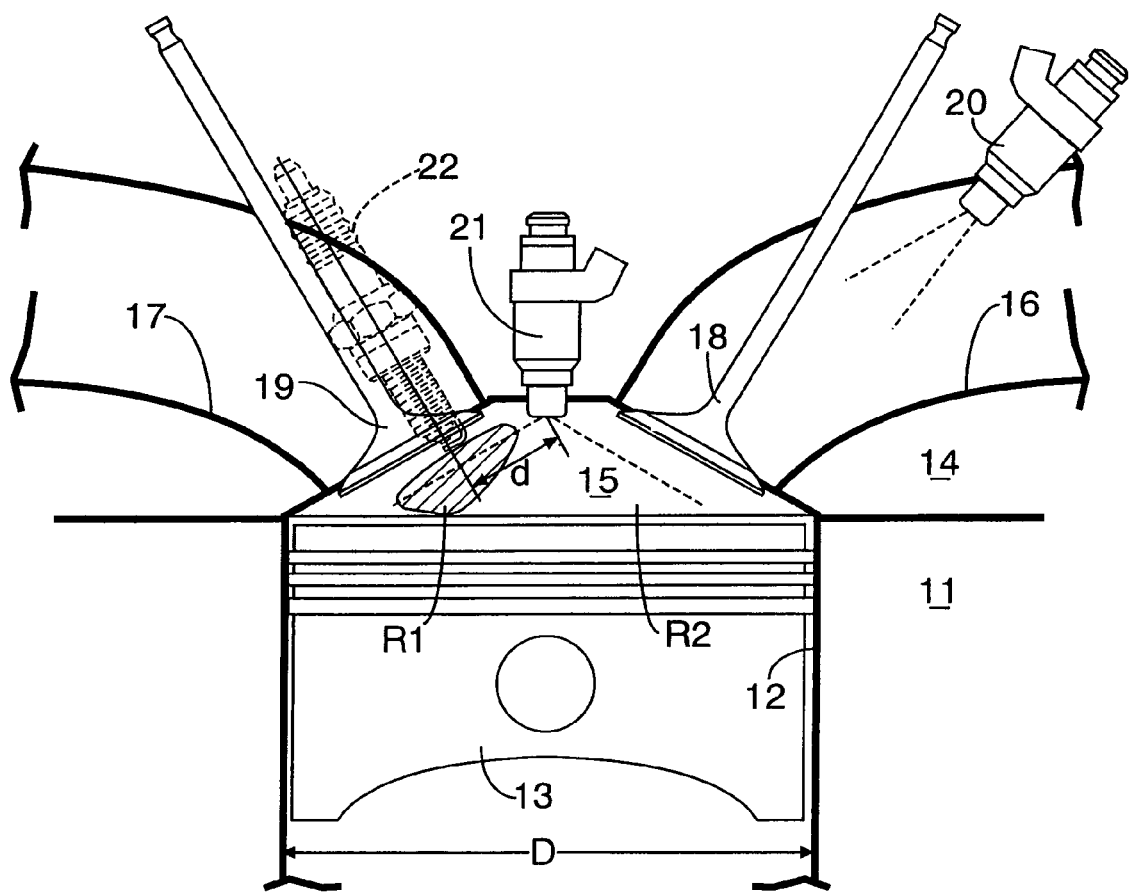
FIG. 1 is a schematic diagram of the structure around a combustion chamber of an internal combustion engine according to a preferred embodiment of the present invention.

As shown in FIG. 1, an internal combustion engine according to the present invention includes a cylinder block 11, a piston 13 slidably received in a cylinder 12 formed in the cylinder block 11, and a combustion chamber 15 defined between an upper surface of the piston 13 and a lower surface of a cylinder head 14. An intake port 16 and an exhaust port 17 are formed in the cylinder head 14. An intake opening of the intake port 16 opening into the combustion chamber 15 is opened and closed by an intake valve 18. An exhaust opening of the exhaust port 17 opening into the combustion chamber 15 is opened and closed by an exhaust valve 19. A first injector 20 directed to the combustion chamber 15 is disposed at a position near the intake opening in the intake port 16. A second injector 21 is disposed at a central portion of a top of the combustion chamber 15 and extends along a cylinder axis. A spark plug 22 is disposed at a position near the exhaust valve 19 in the combustion chamber 15.

The first injector 20 mounted in the intake port 16 is adapted to inject fuel at a position 320 degrees before top dead center in a compression stroke. The second injector 21 is adapted to inject fuel at or after a position 40 to 20 degrees before top dead center in a compression stroke (in the embodiment, at a position 30 to 20 degrees before top dead center in a compression stroke). The second injector 21 injects fuel in a conical shape around the cylinder axis, but the density of the injected fuel is uneven in a circumstantial direction such that the density of the fuel injected in a direction toward the spark plug 22 is set to be higher than a density of fuel injected in the other directions.

Figure 2:
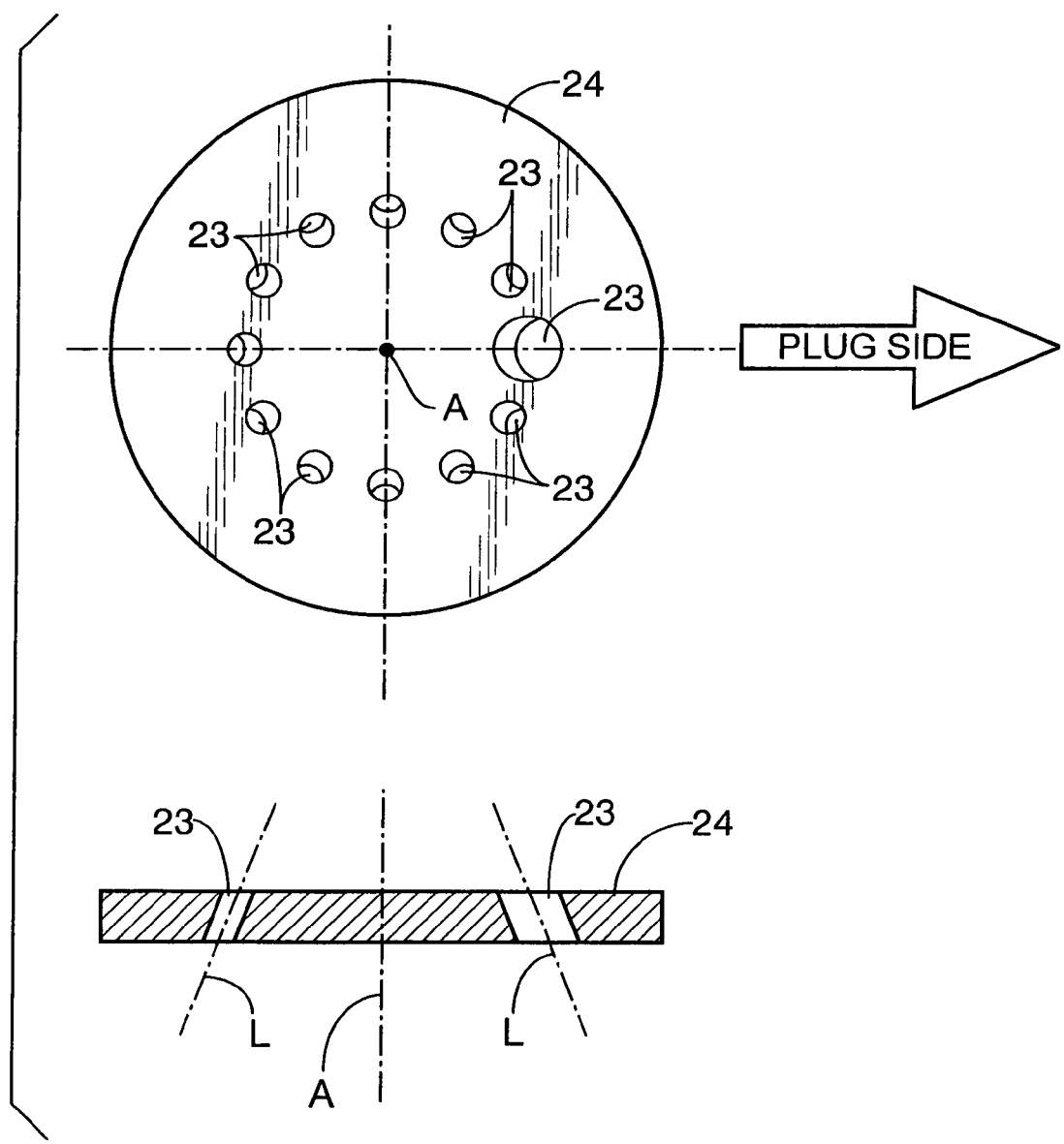
FIG. 2 is a top view of an injector plate having fuel injection bores formed therein.

As shown in FIG. 2, the second injector 21 includes a plate 24 having a plurality of (e.g., 12) fuel injection bores 23 formed therein. The fuel injection bores 23 are disposed on a circle about a centerline A of fuel injection of the second injector 21. An axis L of fuel injection of each fuel injection bore 23 is disposed so as to be conically inclined with respect to the centerline A of fuel injection. The fuel injected along the axis L from the plurality of injection bores 23 is conically diffused into the combustion chamber 15. In this arrangement, the density of the fuel in the vicinity of the spark plug 22 is increased to a level higher than those in the other regions by setting the diameter of one of the fuel injection bores 23, which is directed to an electrode of the spark plug 22, at a value larger than the diameters of the remaining fuel injection bores 23.

Therefore, a rich air-fuel mixture region R1 (an obliquely lined region within the combustion chamber 15 in FIG. 1) having a partially higher air-fuel ratio, is formed around the spark plug 22 in the combustion chamber 15, and a lean air-fuel mixture region R2 (a blank region within the combustion chamber 15 in FIG. 1) having a lower air-fuel ratio, is formed in another region of the combustion chamber 15.

There are various other techniques for increasing the fuel density in the vicinity of the spark plug 22 to a level higher than that in the other regions. For example, the plural fuel injection bores 23 can be disposed at uneven intervals in the circumferential direction, and the plural fuel injection bores 23 directed to the vicinity of the electrode of the spark plug 22 are disposed close to each other. Also, additional fuel injection bores 23, 23 directed to the vicinity of the electrode of the spark plug 22 are disposed on a radially outer side and a radially inner side of one fuel injection bore 23 directed to the electrode of the spark plug 22. Further, the fuel density in the vicinity of the spark plug 22 is increased to a level higher than in the other regions by injecting the fuel only in a direction toward the spark plug 22 from the second injector 21.

In this embodiment, the distance between a fuel injection nozzle at the tip end of the second injector 21 and the electrode at the tip end of the spark plug 22 is set to a value in a range from 14 mm to 21 mm, which is smaller than a value in a range of 30 mm to 40 mm in the related art engine (JP '651). Namely, the distance d is set at a value equal to ⅙ to ¼ of the inner diameter D of the cylinder 12.

Thus, the lean air-fuel mixture region R2, which is even in air-fuel ratio and leaner than a theoretical air-fuel ratio, is formed in most regions within the combustion chamber 15 by the fuel injected from the first injector 20, and the rich air-fuel mixture region R1 is formed in the vicinity of the spark plug 22 by the fuel injected from the second injector 21. When the air-fuel mixture in the rich air-fuel mixture region R1 near the spark plug 22 is ignited by a spark generated by the spark plug 22 as a gathering coal, the air-fuel mixture in the lean air-fuel mixture region R2 is subjected to a compressive hypergolic ignition by heat generated from the propagation of a flame in the rich air-fuel mixture region R1.

Figure 3A:
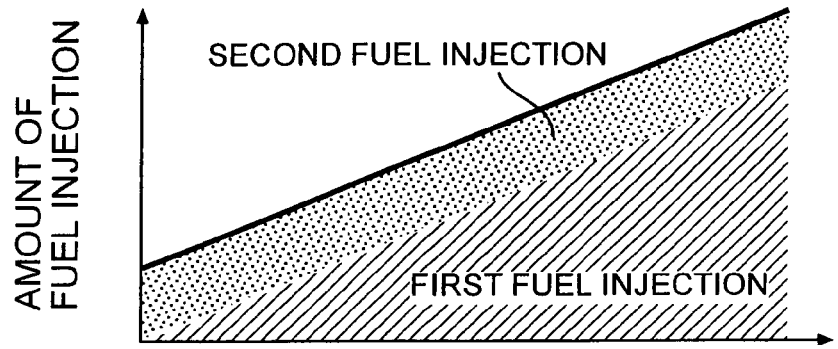
FIGS. 3A to 3C are graphs showing changes in an amount of injected fuel, in an amount of gas in a cylinder and in an air-fuel ratio, respectively, relative to a change in the operating load on the internal combustion engine.
Figure 3B:
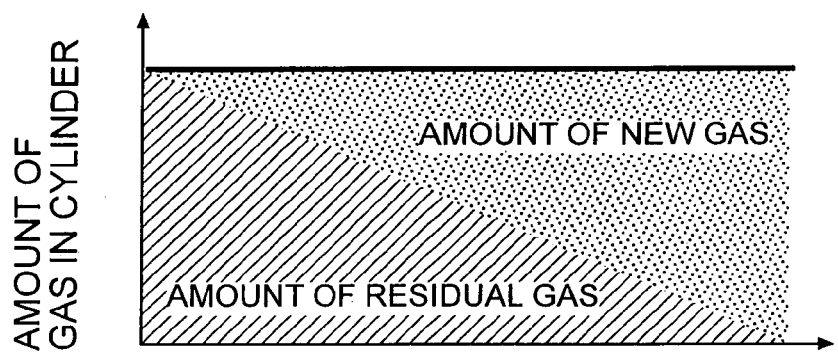
Figure 3C:
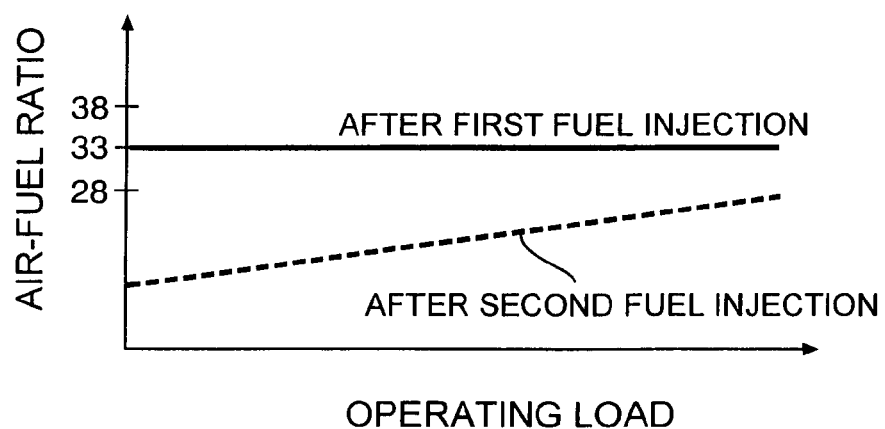

As shown in FIG. 3A, an amount of fuel injection conducted at a position 35 to 18 degrees before the top dead center in a compression stroke by the second injector 21 is constant regardless of an operating load on the internal combustion engine. On the other hand, an amount of fuel injection conducted at a position 320 degrees before the top dead center in a compression stroke by the first injector 20 is increased with an increase in the operating load on the internal combustion engine. However, as shown in FIG. 3C, the air-fuel ratio of the air-fuel mixture produced in the combustion chamber 15 by the first fuel injection is set at a predetermined value (e.g., 33) within a range of 28 to 38. The reason why the air-fuel ratio after the second fuel injection is increased with an increase in operating load is so the amount of newly drawn-in gas is increased corresponding to an increase in the operating load to relatively decrease the proportion of fuel with respect to air.

In order to maintain the air-fuel ratio at the predetermined value of 33, even if the amount of injected fuel in the first fuel injection is increased due to an increase in the operating load, the amount of gas residing in the cylinder is decreased due to the increase in operating load causing the amount of newly-drawn gas to be increased. Specifically, the amount of gas residing in the cylinder is decreased by delaying the time the exhaust valve 19 is closed to correspond to the increase in the operating load and, correspondingly, the amount of gas newly drawn into the cylinder is increased, wherein the air-fuel ratio is maintained at the predetermined value of 33.

As shown in FIG. 4A, when the air-fuel ratio is 29, the amount of discharged NOx is minimal, and even if the air-fuel ratio is increased or decreased from 29, the amount of discharged NOx is increased. When the air-fuel ratio is lower than 25, there is a possibility that knocking will occur, and when the air-fuel ratio is higher than 58, there is a possibility that misfire will occur. As shown in FIG. 4B, when the air-fuel ratio is 37, the amount of consumed fuel is minimal, and even if the air-fuel ratio is increased or decreased from 37, the amount of consumed fuel is increased. Therefore, it is possible to decrease the amount of discharged NOx and the amount of consumed fuel by setting the air-fuel ratio provided by the first fuel injection in an optimum range from 28 to 38.

The reason for the above-described beneficial results is considered to be as follows. In the process where the temperature and pressure rise due to the start of the first combustion by spark-ignition to the rich air-fuel mixture region R1 produced around the spark plug 22 by the fuel injected from the second injector 21, the lean air-fuel mixture region R2 produced within the combustion chamber 15 by the fuel injected from the first injector 20 is subjected to a compressive hypergolic ignition to start the second combustion. Also, the timing of the second combustion starting is optimized by setting the air-fuel ratio of the lean air-fuel mixture region R2 in the range of 28 to 38. Therefore, a stable combustion state free of knocking and misfire is provided to decrease the amount of discharged NOx and the amount of consumed fuel in a wider range of the operating load.

Further, according to the present invention, the distance d between the fuel injection nozzle at the tip end of the second injector 21 and the electrode at the tip end of the spark plug 22 is set at a value equal to ⅙ to ¼ of the inner diameter D of the cylinder 12, thereby achieving the below-described results.

A jet of the injected fuel from the second injector 21 directed to the spark plug 22 is ignited by a spark from the spark plug 22 when the jet reaches the spark plug 22. It is known that the earlier the timing of such an ignition occurs (namely, the timing of stoppage of the second fuel injection), with respect to the top dead center in a compression stroke, the more the amount of discharged NOx is increased. However, if the timing of the second fuel injection from the second injector 21 is delayed to be closer to the top dead center in a compression stroke in order to decrease the amount of discharged NOx, the penetration force of the jet directed to the spark plug 22 is reduced due to a decrease in the pressure in the cylinder, as shown in FIG. 5A, and it is difficult for the jet to reach the spark plug 22, resulting in a possibility of a misfire occurring.

In this embodiment, the spark plug is disposed at a position closer to the second injector 21 compared with conventional arrangements, and the distance d between the fuel injection nozzle at the tip end of the second injector 21 and the electrode at the tip end of the spark plug 22 is set at the value equal to ⅙ to ¼ of the inner diameter D of the cylinder. Therefore, even if the timing of the second fuel injection is stopped, which is 55 to 40 degrees before the top dead center in a compression stroke in the conventional device, is delayed to a position 40 to 20 degrees before the top dead center in a compression stroke to decrease the amount of discharged NOx, it is possible to ensure that the jet directed to the spark plug 22 reliably reaches the spark plug 22, thereby preventing a misfire and/or unstable combustion from occurring.

A preferred embodiment of the present invention has been described above, but various changes thereto may be made without departing from the scope and spirit of the present invention.

For example, in the preferred embodiment, the first fuel injection is conducted by the first injector 20, and the second fuel injection is conducted by the second injector 21, but the first injector may be eliminated and only the second injector 21 remain to conduct both the first and second fuel injections.

Figure 6:
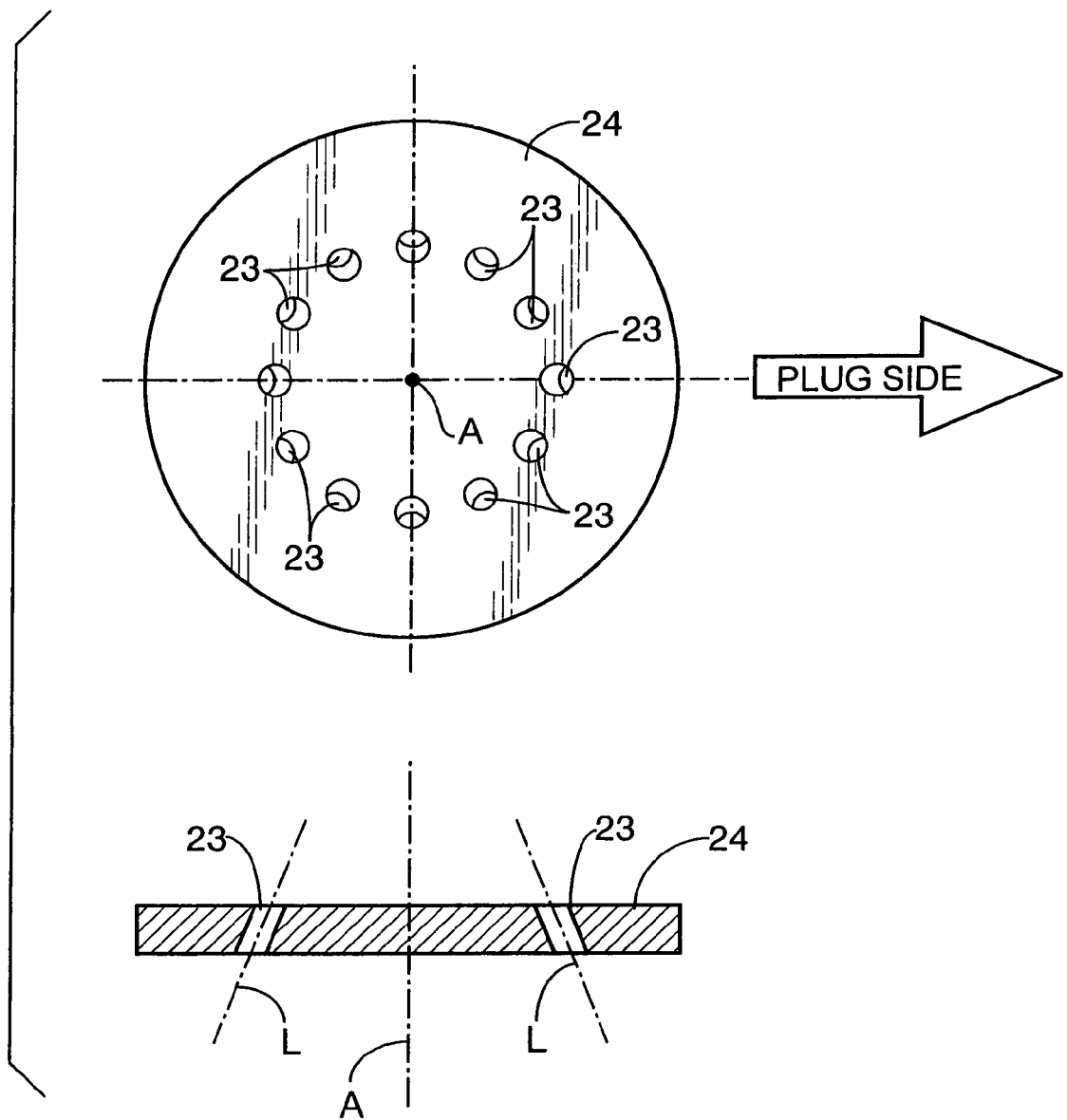
FIG. 6 is a top view of an injector plate having fuel injection bores formed therein according to another embodiment of the present invention.

Also, in the preferred embodiment, the second fuel injection from the second injector 21 provides an uneven injection such that an extra amount of fuel is injected in a direction toward the spark plug 22. However, as shown in FIG. 6, in another embodiment of the present invention the second fuel injection may be an even injection such that the fuel is injected evenly in a circumferential direction by evenly disposing the plural fuel injection bores 23 in the plate 24 of the second injector 21 on the circle about the centerline A of fuel injection, and setting the diameters of the fuel injection bores 23 to be a common (or same) value.

What is claimed:

1. An internal combustion engine comprising:

a first injector for injecting fuel into an intake port or a combustion chamber;

a second injector for injecting the fuel into the combustion chamber following the injection of the fuel by the first injector; and a spark plug for igniting an air-fuel mixture within the combustion chamber, wherein an air-fuel ratio of the air-fuel mixture produced in the combustion chamber by the injection of the fuel by the first injector is set in a range of 28 to 38, wherein an amount of the fuel injected by the second injector is fixed at a given value, and an amount of the fuel injected by the first injector is changed corresponding to a demanded operating load, and wherein when the demanded operating load is changed, a ratio between an amount of gas residing in a cylinder and an amount of gas newly drawn therein is controlled based on a closing timing of an exhaust value.

2. The internal combustion engine according to claim 1, wherein a distance between the second injector and the spark plug is set to a value corresponding to $1/6$ to $1/4$ of an inner diameter of the cylinder.

3. The internal combustion engine according to claim 1, wherein the plurality of bores are disposed on a circle about the centerline of the fuel injection of the second fuel injector.

4. The internal combustion engine according to claim 3, wherein the plurality of bores are each disposed at uneven intervals relative to each other in a circumferential direction.

5. The internal combustion engine according to claim 4, wherein the plurality of bores are each disposed at even intervals relative to each other in a circumferential direction.

6. The internal combustion engine according to claim 1, wherein one of the plurality of bores has a diameter larger than a diameter of the remaining bores of the plurality of bores.

7. The internal combustion engine according to claim 1, wherein the plurality of bores each have a diameter having a common value.

8. The internal combustion engine according to claim 1, wherein the second fuel injector includes a plate having a plurality of bores defined therein, each bore having an axis of fuel injection that is oblique relative to a centerline of fuel injection of the second fuel injector.

9. The internal combustion engine according to claim 1, wherein the second fuel injector includes a plate having a plurality of bores defined therein, each bore having an axis of fuel injection that is oblique relative to a centerline of fuel injection of the second fuel injector.

10. A fuel injection method in an internal combustion engine, comprising:

a first step of injecting fuel from a first injector into an intake port or a combustion chamber; and a second step of injecting the fuel from a second injector into the combustion chamber following the injection of the fuel by the first injector, wherein an air-fuel ratio of an air-fuel mixture produced in the combustion chamber in the first step is set in a range of 28 to 38, wherein an amount of the fuel injected by the second injector is fixed at a given value, and an amount of the fuel injected by the first injector is changed corresponding to a demanded operating load, and wherein when the demanded operating load is changed, a ratio between an amount of gas residing in a cylinder and an amount of gas newly drawn therein is controlled based on a closing timing of an exhaust valve.

* * * * *